April 19, 1960  G. O. HILLARD, JR  2,933,539
FRACTIONATION OF CYCLODIENE MONOMER VAPORS
Filed April 23, 1958
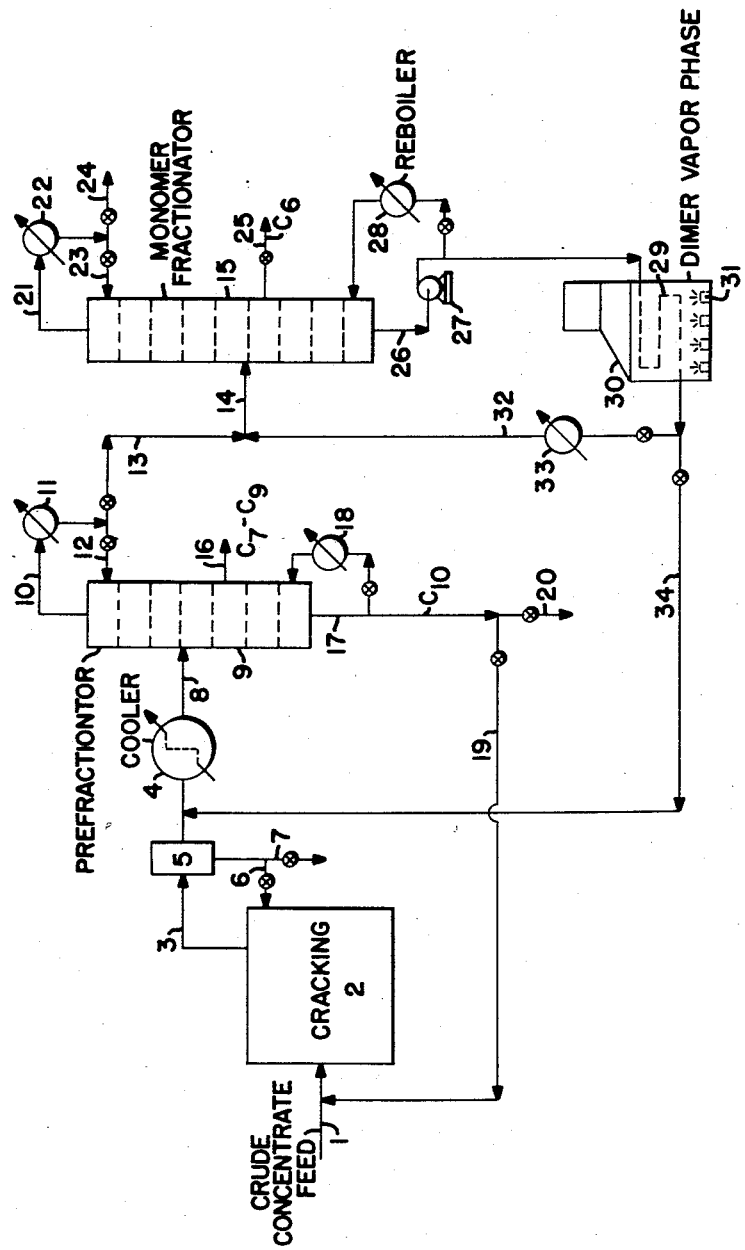
George Oliver Hillard, Jr.  Inventor
By Henry Berk  Attorney

2,933,539

FRACTIONATION OF CYCLODIENE MONOMER VAPORS

George Oliver Hillard, Jr., Baton Rouge, La., assignor to Esso Research and Engineering Company, a corporation of Delaware Application April 23, 1958, Serial No. 730,406

5 Claims. (Cl. 260—666)

This invention relates to a process of recovering $C_5$ and $C_6$ cyclodiene monomer products of improved yields and purity from a vapor stream mixture of the monomers. These monomers, known as cyclopentadiene and methyl cyclopentadiene, are present in a vapor stream mixture formed by liquid or vapor phase cracking of crude concentrates of their dimers, codimers, and polymers.

Separation of the monomers from the vapor stream produced by cracking the crude concentrates involves a number of problems which arise from redimerization and polymerization occurring during fractional distillation of the monomers; also, from the presence and reaction of other contaminating components.

In accordance with the present invention, improvement is made in the recovery and purification of the $C_5$ and $C_6$ cyclodiene monomers by a vapor phase recracking of dimer and codimer bottoms removed from the monomer fractionating zone and by passing the recracking products back into admixture with the vapor stream from the cracked crude concentrate at a suitable place in the system so as to avoid undesired contamination or adverse effects on the necessary separation steps.

The monomer fractionator bottoms have now been found to undergo recracking most favorably with exclusion of other hydrocarbon materials such as present in the crude concentrate when subject to vapor phase cracking at relative low temperatures of 350 to 550° F., low pressures near 1 atmosphere or less, and in short contact times of about 0.1 to 1.0 second.

The monomers formed by the vapor phase recracking of the monomer fractionator bottoms are passed for the most part after cooling to a temperature in the range of about 115 to 140° F. into admixture with the fresh vapor mixture stream feed to the monomer fractionator of $C_5$ and $C_6$ cyclodiene monomers freed as much as practicable of contamination by other $C_5$ to $C_9$ hydrocarbons. This stream is the overhead fraction from a prefractionating tower which receives the vapor mixture formed by cracking the crude dimer concentrate and in which $C_7$ to $C_9$ components are separated preferably to be purged from the system.

The two-tower recovery system used most satisfactorily for the recovery method of the present invention is illustrated in the schematic flow diagram of the drawing.

Referring to the drawing, the process starts with initial heating and cracking of a crude cyclodiene dimer concentrate passed by feed line 1 into the cracking vessel or unit 2.

The crude dimer concentrate is usually formed by heat soaking a $C_5$ to $C_6$ cyclodiene monomer rich fraction for some hours at 160 to 200° F. to dimerize the cyclodiene monomers then stripping out components lower boiling than the $C_{10}$ to $C_{12}$ dimers and codimers. The thus obtained concentrate is thus freed insofar as practicable of $C_5$ and low acyclic components, such as isoprene, and piperylene but will contain generally small appreciable amounts of such components with $C_7$ to $C_{10}$ compounds including $C_7$ cyclodienes, e.g. dimethyl or ethyl cyclopentadiene, and aromatic hydrocarbons. In obtaining the concentrate some codimerization and polymerization of the contaminants is difficult to avoid. Also, if some endeavor is made to carry out a careful stripping some loss of the desired monomers may be entailed. Thus the $C_5$ to $C_6$ cyclodiene dimer concentrate usually may contain 15 to 30% of contaminants.

For cracking the crude dimer concentrate of the $C_5$ to $C_6$ cyclodienes, any known method may be employed, e.g. liquid phase cracking at 350 to 450° F. or vapor phase cracking at higher temperatures up to about 800° F. During the cracking the $C_5$ and $C_6$ cyclodiene monomers are formed but at the same time other polymers and copolymers even from contaminants tend to be formed. Some of the polymers formed become very refractory to cracking and become converted to tars as they are heated for an extended period. That is why it has been found desirable to devise methods for eliminating such reactions.

The vapor stream rich in $C_5$ and $C_6$ cyclodiene monomers generated in a cracking zone of unit 2 is passed by line 3 to a cooler 4 which is a heat exchange means for lowering the temperature of the vapor stream to about 200 to 300° F. A knockout vessel 5 may be interposed in line 3 to drop out entrained polymer, which may be recycled to the cracking zone by line 6 or be removed from the system by line 7.

The cooled vapor stream leaving cooler 4 is passed by line 8 into the prefractionating tower 9 from which $C_5$ to $C_6$ cyclodiene monomer vapor is taken overhead at a vapor temperature in the range of 100 to 140° F. through line 10 to condenser 11. The preferred overhead vapor temperature is in the range of 135 to 140° F. and control is obtained by using a suitable reflux ratio, reflux condensate being returned by line 12 from condenser 11 to the top of tower 9. The reflux ratio is variable, but may be of the order of 5/1 or down to 1/1. The remaining overhead stream of $C_5$ and $C_6$ monomers with as little contamination as feasible is passed on by line 13 to the feed inlet 14 of monomer fractionating tower 15.

A side stream drawoff line 16 is used for removing an intermediate fraction rich in $C_7$ to $C_9$ hydrocarbons which will normally be at temperatures in the range of about 265 to 285° F. This fraction is preferably purged from the system to avoid undesired repolymerization of components present therein and buildup of contaminants in various parts of the system which otherwise would result.

Bottoms drawn from the bottom of prefractionating tower 9 by line 17 may in part be recirculated through an external heat exchange reboiler 18 to maintain a temperature of about 300 to 340° F. in the kettle or bottom part of tower 9. An internal heating coil (not shown) in the kettle portion may be used.

Overhead vapors from tower 9 are led by line 10 to cooling condenser 11. A portion of condensate (e.g. ½ up to ⅚ or more) is refluxed by line 12 to the top of tower 9 for temperature control. The remaining overhead distillate of $C_5$ and $C_6$ cyclodiene monomers contaminated by less than about 1.5% $C_7$ or other impurities is passed to the monomer fractionator 15 by lines 13 and 14.

The fractionation zone in monomer fractionator 15 is purposely kept as free as possible of hydrocarbons other than the $C_5$ and $C_6$ cyclodienes and their dimers, codimers or polymers. Therefore, it is important to prevent more than small or trace amounts of the $C_7$ to $C_9$ hydrocarbon contaminants from entering tower 15.

Tower 15 is operated to take overhead into line 21 $C_5$ monomer vapors, e.g. at vapor temperatures of about 100 to 108° F., and to separate an intermediate $C_6$ monomer fraction which is recovered as an intermediate fraction.

In some instances, to increase yields of the monomers, some or all of the bottoms from prefractionating tower 9 is recycled as by line 19 to the crude dimer concentrate cracking zone in unit 2. Some or all of the bottoms from tower 9 may be purged from the system through line 20 depending on how the system is being operated. Also, $C_7$ to $C_9$ may be purged with these bottoms. In any event, the present invention is not concerned with any further treatment of such materials.

For the purposes of the present invention, the fractionation zone of monomer fractionating tower 15 is kept as free as possible of hydrocarbons other than $C_5$ and $C_6$ cyclodiene monomers, their dimers and codimers, each with the other.

Tower 15 is operated normally to pass overhead through line 21 $C_5$ cyclodiene monomer vapor at vapor temperatures of 100 to 108° F. These vapors cooled and condensed in cooler 22 supply reflux, e.g. ½ to ⅚ of overhead, which is returned by line 23 to the top of tower 15. The remaining overhead product is then collected from line 24 as finished product or for further treatment, e.g. dimerizing as a convenience for storage or transportation.

The $C_6$ cyclodiene monomer is recovered as an intermediate fraction, vapor or liquid, which may be withdrawn as a side stream through line 25 below the feed inlet line 14. The feed line 14 may be in the region of the 10 to 20th plates from the bottom of a 30 plate tower and the side stream line may then be in the region of the 5th to 8th plates from the bottom. However, a second tower may be used to receive bottom reflux from the $C_5$ monomer fractionator so that the $C_6$ monomer would then be the overhead from such a second tower. For the sake of simplicity, a double tower monomer fractionation hookup is not shown, but the principles of the present invention apply to such as well as to a single monomer fractionating tower.

To maintain adequate heat input for tower 15, or for the double tower, heat may be supplied to the bottoms from internal heating coils (not shown) but preferably a portion of the bottoms from which the $C_5$ and $C_6$ monomers are stripped, is withdrawn as by line 26 and pump 27 with which a portion is circulated through a reboiler 28 back to the bottom of the monomer fractionator 15 to maintain the bottoms at a temperature in the range of 180 to 250° F. A suitable rate of circulation and temperature can be selected to supply the heat needed without causing substantial cracking of the bottoms sent through the reboiler. The heat exchange medium for reboiling may be steam and a suitable rate of circulation for the bottoms through the reboiler is such as to expose the bottoms to heating for only about 5 to 10 minutes. These bottoms comprise principally dimers and codimers formed by redimerizing of the $C_5$ and $C_6$ monomers.

A main portion of the bottoms from the monomer fractionating zone by line 26 is passed into a cracking coil 29 located in furnace 30 for vapor phase cracking under conditions conducive to high conversion to the monomers with minimum coke formation, for example, relatively low pressures below 4 atm., preferably about 1 atm. or lower, relatively low temperatures in the range of 300 to 700° F., preferably 350 to 550° F. and for a short period of 0.1 to 1.0 second. The cracking coils may be made up in multipass form. The cracking furnace is provided preferably with a number of fuel burners 31 located and operated to give uniform heating. With proper heating the temperature differential from one end to the other of the coil is kept low, e.g. 0 to 40° F.

Effluent monomer vapor product from the outlet of the cracking coil 29 is passed principally by line 32 through a cooler 33 for quick cooling to a temperature in the range of 115 to 140° F. then is admixed with the $C_5$ to $C_6$ monomer feed from the prefractionator to the monomer fractionator 15. The thus mixed $C_5$ and $C_6$ monomers are brought into the monomer fractionation zone of tower 15 so that recovery of each monomer is permitted without causing addition of $C_5$ monomers to the $C_6$ monomer fraction which is separated at a lower plate as vapor, liquid, or both.

Any desired portion of effluent from the recracking coil 29 may be passed continuously or intermittently by line 34 to mix with the original cracking vapor stream passed through line 4 to aid in purging contaminants from the monomer fractionator, e.g. small amounts of dimer and codimer of $C_7$ and to aid in controlling the operation of the monomer fractionator 15. Otherwise there is a tendency for undesirable polymer to build up in the directly recycled bottoms of tower 15, and this leads to introduction of contaminants into the monomer products, also in increased coking within the vapor phase cracking coil 29.

The following example is representative of the manner in which vapor-phase recracking of the monomer fractionator bottoms was demonstrated to give satisfactory results in obtaining especially high purity methyl cyclopentadiene with hardly perceptible coke formation in the vapor-phase recracking coil.

*Example*

A total of 5,000 gallons of methyl cyclopentadiene was to be produced. Initial operations of recracking monomer fractionator bottoms produce a methyl cyclopentadiene product of only 85 to 90% purity since the recracked products were returned below the plate from which the methyl cyclopentadiene fraction was removed from the monomer fractionator. The principal contaminants were cyclopentadiene 3.5 to 6.0% and $C_7$ cyclodiene 1 to 2%, acyclic dienes, and about 1 to 2% other impurities.

Continuing the operation but by passing recracking effluent above the plate from which the methyl cyclopentadiene was removed, the purity of the methyl cyclopentadiene product is increased to about 95% and higher, with $C_5$ content below 2%.

The bottoms vapor-phase recracking was carried out with negligible pressure buildup during periods as long as several hundred hours using a vapor-phase cracking temperature of between 525 and 550° F. During another period of operation the recracking temperatures were kept mainly between 500 and 525° F.

By recycling from 5 to 10% of the recracked effluent to the initial stream of cracked concentrate vapors instead of purging this material directly a gain in yield of the desired monomers is obtained, since in the direct purge about 9% loss of $C_5$ and $C_6$ cyclodienes based on fresh feed is sustained.

The initial feeds processed, termed dimer concentrates, generally comprise 30 to 50% cyclopentadiene, 25 to 40% methyl cyclopentadiene, 2 to 10% acyclic dienes, 5 to 10% $C_7$ cyclodienes with small amounts of other hydrocarbons in the $C_5$ to $C_9$ range, the diolefins being principally in dimerized form.

For a suitably balanced operation in which the total dimer bottoms of the monomer fractionator amounts to about 5 to 15% of the feed to this fractionator, 25 to 75% of this bottoms may be recracked in the bottoms recracking zone wherein impurities other than those present in the bottoms withdrawn from said fractionator are excluded, and the remaining portion of said bottoms may be circulated through the reboiler. Out of the recracked bottoms not returned to the monomer fractionator the portion recycled to the monomer vapor mixture passed to the prefractionator may amount to 5 to 15% of said total dimer bottoms.

Having described the invention, it is claimed as follows:

1. In a process of recovering separate $C_5$ and $C_6$ cyclodiene monomer fractions from a vapor mixture containing them with lesser amounts of $C_7$ to $C_9$ impurities as a result of cracking a dimer concentrate, the improvement which comprises fractionating said vapor mixture in a prefractionating zone to separate mixed $C_5$ and $C_6$ monomer vapors from said impurities, passing the $C_5$ and $C_6$ monomer vapors from said prefractionating zone through an inlet into a monomer fractionating zone where $C_5$ monomer is taken overhead as vapor, $C_6$ monomer is separated as an intermediate fraction below said inlet, and redimerized products formed are separated as a bottoms, passing a substantial part of said bottoms through a recracking zone in which $C_5$ and $C_6$ monomer vapors are formed as a product from said bottoms, and passing said recracked product into the monomer fractionating zone above the place where the $C_6$ monomer is separated as an intermediate product.

2. The process of claim 1, in which the $C_6$ monomer intermediate fraction is withdrawn as vapor from the monomer fractionating zone.

3. The process of claim 1, wherein the recracking of bottoms from the monomer fractionating zone is carried out at vapor-phase cracking temperatures in the range of 350 to 550° F.

4. The process of claim 1, wherein a portion of recracked monomer fractionating zone bottoms products is recycled to the vapor mixture passed to said prefractionating zone.

5. The process of claim 1, wherein a portion of the monomer fractionating zone bottoms is heated by circulation through a reboiling zone without substantial cracking and is returned to said zone below the place where the $C_6$ intermediate fraction is separated.

References Cited in the file of this patent

UNITED STATES PATENTS

| | | |
|---|---|---|
| 2,636,056 | Jones | Apr. 21, 1953 |
| 2,733,280 | Hamner | Jan. 31, 1956 |
| 2,751,422 | Nelson et al. | June 19, 1956 |
| 2,801,270 | Nelson et al. | July 30, 1957 |
| 2,813,134 | Johnson | Nov. 12, 1957 |